United States Patent [19]
Suzuki et al.

[11] Patent Number: 4,659,917
[45] Date of Patent: Apr. 21, 1987

[54] FOCUS DETECTOR HAVING FIRST AND SECOND NON-OVERLAPPING SENSOR SERIES

[75] Inventors: Takashi Suzuki, Yokohama; Susumu Matsumura; Kenji Suzuki, both of Kawasaki; Keiji Otaka, Yokohama, all of Japan

[73] Assignee: Canon Kabushiki Kaisha, Tokyo, Japan

[21] Appl. No.: 472,952

[22] Filed: Mar. 7, 1983

[30] Foreign Application Priority Data

Mar. 13, 1982 [JP] Japan ................................ 57-40016

[51] Int. Cl.⁴ ................................................. G01J 1/20
[52] U.S. Cl. ............................................ 250/201; 354/407
[58] Field of Search .................. 354/406, 407, 402; 350/103; 250/201 R, 204, 237 G, 201 DF

[56] References Cited

U.S. PATENT DOCUMENTS

| | | | |
|---|---|---|---|
| 3,781,110 | 12/1973 | Leitz et al. | 250/201 DF |
| 3,970,842 | 7/1976 | Nanba et al. | 250/201 PF |
| 4,117,325 | 9/1978 | Holle et al. | 250/201 PF |
| 4,185,191 | 1/1980 | Stauffer | 250/204 |
| 4,258,989 | 3/1981 | Tokutomi et al. | 354/25 |
| 4,265,520 | 5/1981 | Tokutomi et al. | 250/204 |
| 4,443,079 | 4/1984 | Oinoue | 354/407 |

*Primary Examiner*—David C. Nelms
*Assistant Examiner*—William L. Oen
*Attorney, Agent, or Firm*—Fitzpatrick, Cella, Harper & Scinto

[57] ABSTRACT

Disclosed is an optical system for detecting the state of focus in which the exit pupil of an image-forming optical system is optically divided into a plurality of exit pupils by an optical member having a beam splitting element, the image-forming light beams from the divided exit pupils are used to form a plurality of image intensity distributions regarding an object image, sensor series each having a plurality of sensors and putting out signals corresponding to the image intensity distributions are disposed at positions whereat the plurality of image intensity distributions are formed, and the output signals from the sensor series are used to detect the relative position of the image intensity distributions to thereby discriminate the state of focus of the image-forming optical system.

8 Claims, 10 Drawing Figures

FIG. 1 PRIOR ART
FIG. 2
FIG. 3
FIG. 4
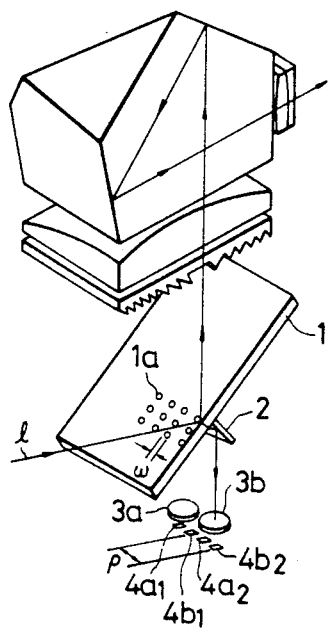
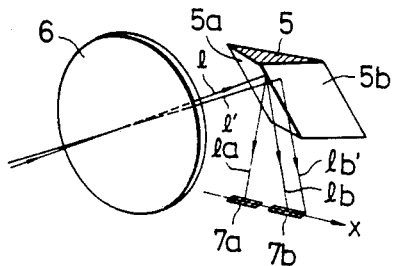
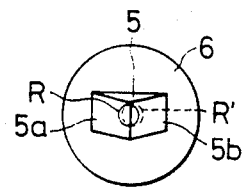
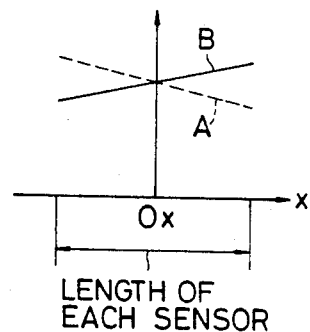

FOCUS DETECTOR HAVING FIRST AND SECOND NON-OVERLAPPING SENSOR SERIES

BACKGROUND OF THE INVENTION

1. Field of the Invention

This invention relates to an optical system for detecting the state of focus, and in particular to such optical system suitable for determining the focusing of a single lens reflex camera such as a camera or a video camera.

2. Description of the Prior Art

The heretofore proposed optical systems for detecting the state of focus of single lens reflex cameras or the like are generally classified into two types, i.e. the image sharpness detection type and the image displacement detection or image correlation detection type.

In the image sharpness detection system such as disclosed in, for example, Japanese Laid-open Patent Application No. 155308/1980, the degrees of sharpness of the object images on three CCD line sensors, disposed on a predetermined image-forming plane of the image-forming optical system and equidistantly forwardly and rearwardly thereof respectively, are compared to detect the state of focus.

On the other hand, the optical system for detecting the state of focus of a camera using the image displacement detection or image correlation detection system is known, for example, from Japanese Laid-open Patent Application No. 143315/1978, Japanese Laid-open Patent Application No. 7323/1979 or U.S. Pat. No. 4,185,191. FIG. 1 of the accompanying drawings schematically show the construction of a device using the system of U.S. Pat. No. 4,185,191. An image forming light beam 1 from an image-forming lens, not shown, passes through a partly transmitting quick return mirror 1 and then enters a submirror 2 and is downwardly reflected and enters a lenslet array comprising juxtaposed lenslets 3a, 3b, . . . . Respective sets of light-receiving sensors $4a_1$, $4a_2$; $4b_1$, $4b_2$; . . . are disposed rearwardly of the respective lenslets 3a, 3b, . . . . In the case of such image displacement detection or image correlation detection system, the lenslets 3a, 3b, . . . are present at positions conjugate with the predetermined image-forming plane and therefore, during the in-focus state, entirely the same information light enters the sets of sensors $4a_1$, $4a_2$; $4b_1$, $4b_2$; . . . disposed rearwardly of the respective lenslets 3a, 3b, . . . When the image-forming plane of the image-forming light beam 1 does not exist on the lenslet array lying on the predetermined image-forming plane, that is, during the out-of-focus state, the sensor array comprising sensors $4a_1$ and $4b_1$ and the sensor array comprising sensors $4a_2$ and $4b_2$ receive image information having an amount of image displacement corresponding to the amount of defocus. In FIG. 1, the quick return mirror 1 is not an ordinary beam splitter using a semi-transparent film of dielectric material, but a so-called wavefront division type patterned beam splitter having light-transmitting portions 1a of diameter W. Such a patterned beam splitter performs the role of a low-pass filter, and the size and distribution of the light-transmitting portions 1a are determined in conformity with the arrangement pitch p of each sensor $4a_1$, $4b_1$ of the sensor array.

When it is supposed that such optical system is incorporated as the image displacement detection or image correlation detection system into a camera, there is, for example, a method whereby the image-forming light beam 1 is divided into two light beams and two image intensity distributions regarding the object images formed by the divided two light beams are formed and used to detect the state of focus. A roof type submirror 5 as shown, for example, in FIG. 2 of the accompanying drawings is conceivable as a beam splitting element for dividing the image-forming light beam 1 into two light beams. In FIG. 2, the light beam 1 from an image-forming lens 6 enters the roof type submirror 5 having two reflecting surfaces 5a and 5b, and then is reflected by the reflecting surfaces 5a and 5b to provide light beams 1a and 1b, which are incident on downwardly positioned line sensors 7a and 7b each comprising, for example, a CCD consisting of a plurality of sensors. The outputs of the line sensors 7a and 7b may then be compared to thereby detect the state of focus. Where the image-forming light beam 1, as shown in FIG. 3 of the accompanying drawings, enters as a circle R intermediate the reflecting surfaces 5a and 5b of the roof type submirror 5, equal quantities of light are directed to the line sensors 7a and 7b, but when use is made of an image-forming lens of great F-number, the off-axis light beam 1', for example, enters the roof type submirror 5 as a circle R' and as a result, almost all of the off-axis light beam 1' enters the reflecting surface 5b to provide a reflected light 1b' and therefore, there occurs a phenomenon that the reflected light beam enters one line sensor 7b while it hardly enters the other line sensor 7a. In a condition in which imbalance has thus occurred between the quantities of light entering the line sensors 7a and 7b, the distributions of quantity of light regarding the image intensity distributions entering the line sensors 7a and 7b when the object to be photographed is a surface of uniform brightness are expressed as schematically shown by A and B in FIG. 4 of the accompanying drawings. In FIG. 4, the abscissa is coincident with the arrangement direction x of the line sensors 7a and 7b shown in FIG. 2 and 0x is the position whereat the light beams on the optical axes on the respective line sensors 7a and 7b intersect each other. The ordinate represents the relative quantity of light, A indicates the distribution of quantity of light on the line sensor 7a which is rightwardly downward, and B indicates the distribution of quantity of light on the line sensor 7b which is rightwardly upward. Such a phenomenon that the distribution of quantity of light is not uniform even if the surface of uniform brightness is imaged is tentatively called the shading, and for example, in the focus detecting device of FIG. 2, if said shading is present when the distributions of quantity of light A and B of the images created on the line sensors 7a and 7b are to be compared and operationally processed, the state of focus cannot be detected properly.

SUMMARY OF THE INVENTION

It is an object of the present invention to provide an optical system for detecting the state of focus using an image displacement detection or image correlation detection system and which can effect accurate detection of the state of focus by the use of a beam splitting element which hardly causes the shading when a light beam from an image-forming optical system is to be divided into a plurality of light beams.

A feature of the present invention is that a patterned beam splitting element in the form of a one-dimensional microprism installed between the image-forming optical system and its predetermined image-forming plane is utilized to optically divide the exit pupil of the image-forming optical system into a plurality of exit pupils and the image-forming light beams from the divided exit pupils are used to form a plurality of image intensity distributions regarding the object image and the relative positional relation between the plurality of image intensity distributions is detected by a sensor unit to thereby discriminate the state of focus of the image-forming optical system.

The invention will become more fully apparent from the following detailed description thereof taken in conjunction with the accompanying drawings.

BRIEF DESCRIPTION OF THE DRAWINGS

FIG. 1 shows the construction of a focusing optical system of a camera using the image displacement detection or image correlation detection system according to the prior art.

FIGS. 2 and 3 illustrate a case where a roof type submirror is used as a beam splitting element.

FIG. 4 illustrates the shading of an image intensity distribution created on the surface of a line sensor.

DESCRIPTION OF THE PREFERRED EMBODIMENTS

The present invention will hereinafter be described with respect to embodiments thereof shown in FIG. 5 et seq.

Figure 5A:
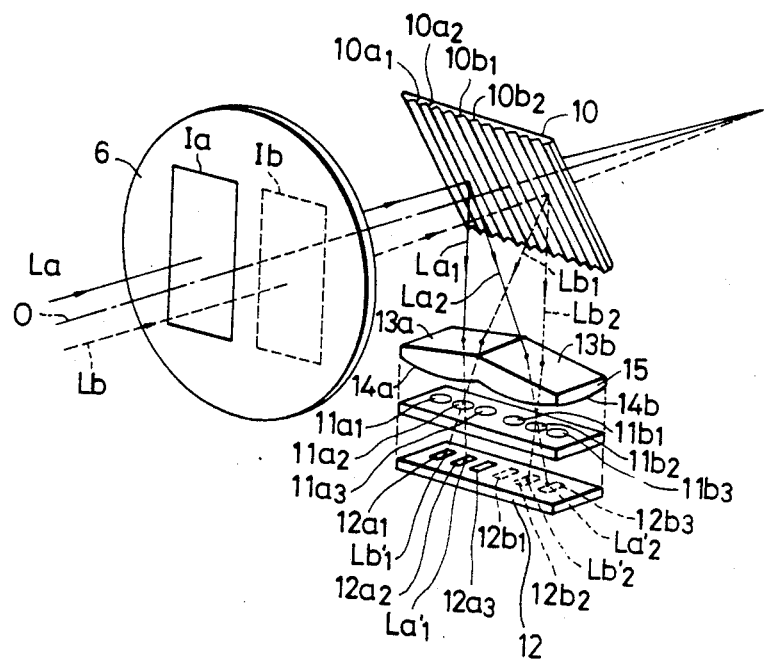
FIGS. 5A and 5B and 6 through 9 show embodiments of the optical system for detecting the state of focus according to the present invention, FIGS. 5A and 5B schematically showing the construction thereof, FIG. 6 being a front view of a multi-surfaced mirror as a beam splitting element, FIGS. 7 and 8 being cross-sectional views of the multi-surfaced mirror, and FIG. 9 showing another construction of the optical system for detecting the state of focus according to the present invention.
Figure 6:
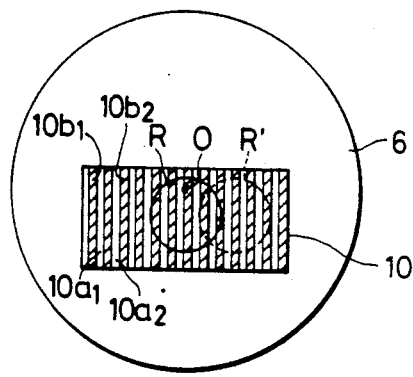

The gist of the present invention resides in that as compared with FIG. 2, for example, a microprism-shaped multi-surfaced mirror 10 exhibiting an optical action in a one-dimensional direction is employed instead of the roof type submirror 5 and that in FIG. 1, two sensors $4a_1$ and $4b_1$ are disposed on a predetermined plane rearward of, i.e. to receive light from, a single lens 3a, whereas in the embodiment of the present invention shown in FIG. 5A, a single sensor $12a_1, 12a_2, \ldots, 12b_1, 12b_2, \ldots$ is disposed at a first position rearward of individual lens portions or lenslets $11a_1, 11a_2, \ldots, 11b_1, 11b_2, \ldots$ Before describing FIG. 5A, the function of a multi-surfaced mirror 10 which is a novel optical element will be described by reference to FIG. 6. FIG. 6 is a front view of the multi-surfaced mirror 10 as seen through an image-forming lens 6 in FIG. 5A. In FIG. 6, a circle R is a cross-section of a light beam L imaged near the optical axis O of the image-forming lens 6 when the light beam is incident on the multi-surfaced mirror 10, and a circle R' is likewise a cross-section of a light beam L' imaged at a position spaced apart from the optical axis O. The cross-sectional shape of the polyhedral mirror 10 is as shown, for example, in FIGS. 7 and 8 which will be described later, and mirror surfaces $10a_1, 10a_2, \ldots$ shown in the form of strips and without hatching applied thereto in FIG. 6 and mirror surfaces $10b_1, 10b_2, \ldots$ shown with hatching applied thereto are series having different inclinations with respect to the optical axis O. The series of mirror surfaces $10a_1, 10a_2, \ldots$ correspond to the mirror surface $5a$ of FIG. 2 and the series of mirror surfaces $10b_1, 10b_2, \ldots$ correspond to the mirror surface $5b$ of FIG. 2. Accordingly, as will readily be understood from FIG. 6, the rate of the area of the series of mirror surfaces $10a_1, 10b_2, \ldots$ contained in the light beam L represented by the circle R and the area of the series of mirror surfaces $10b_1, 10b_2, \ldots$ hardly changes even if the light beam L becomes the offaxis beam L' represented by the circle R' and therefore, the shading as shown in FIG. 4 which is caused by the roof type submirror 5 of FIG. 2 does not occur.

Accordingly, the light beam passed through the image-forming lens 6 in FIG. 5 is incident on the multi-surfaced mirror 10 having its surfaces obliquely disposed with respect to the optical axis O and is thereafter separated into two light beams by the two series of mirror surfaces. The respective light beams then pass through a lens element 15 comprising prism surfaces $13a, 13b$ for correcting the inclination of the image plane from the flat plane and field lenses $14a, 14b$ formed integrally with the prism surfaces and may form image intensity distributions regarding the object image on the lenslets $11a_1, 11a_2, 11a_3, \ldots$ and lenslets $11b_1, 11b_2, 11b_3, \ldots$ of lenslet arrays disposed in two series. The lenslets $11a_1, 11a_2, \ldots$ and $11b_1, 11b_2, 11b_3, \ldots$ of these two series of lenslet arrays are disposed at positions conjugate with the predetermined image-forming plane of the image-forming lens 6 (in the case of a single lens reflex camera, the film surface), and if the image-forming lens 6 lies at a position which renders the object to be photographed and the film surface conjugate with each other, two sharp image intensity distributions will be formed on each lenslet $11a_1, 11a_2, \ldots, 11b_1, 11b_2, \ldots$ of the two lenslet arrays and, if the image-forming lens 6 does not lie at the position which renders the object to be photographed and the film surface conjugate with each other, defocused image intensity distributions will be formed, and further, the spacing between these two image intensity distributions will become different in conformity with the respective amounts of defocus. For example, when the image-forming lens 6 is in front focus, the two image intensity distributions come near each other while blurring, and when the image-forming lens 6 is in rear focus, the two image intensity distributions conversely come off each other while blurring. Of these image intensity distributions, the light beam formed on the lenslets $11a_1, 11a_2, 11a_3, \ldots$ may be incident on the sensors $12a_1, 12a_2, 12a_3, \ldots$ of one sensor array on a sensor substrate 12 and the light beam formed on the lenslets $11b_1, 11b_2, 11b_3$ of the other lenslet array may be incident on the sensors $12b_1, 12b_2, 12b_3, \ldots$ of the second sensor array. In FIG. 5A, the distance in the direction of travel of light is depicted as being greater than the actual distance in order to make the field lenses $14a, 14b$, the lenslets $11a_1, 11a_2, \ldots$, the sensor substrate 12, etc. readily understood. Now, considering a case where a respective sensor, for example, $12a_2$, of the sensor array is reversely projected, the light beam passes through the lenslet $11a_2$ and the field lens $14a$ and is reflected by one series of mirror surfaces $10a_1, 10a_2, \ldots$ of the multi-surfaced mirror 10 and forms an image Ia on or near the exit pupil of the image-forming lens 6, and this image Ia is nearer to one side with respect to the optical axis O of the image-forming lens 6. When the light ray leaving the sensor $12a_2$ is imaged by way of the mirror surfaces $10b_1, 10b_2, \ldots$ of the multi-surfaced mirror 10 which have another inclination, the image is formed on that side opposite to the image Ia with respect to the optical axis O, that is, on that side of the image Ib on which the image of the sensor $12b_2$ is formed by way of the mirror surfaces $10b_1$, $10b_2$, ... of the multi-surfaced mirror 10, and it may deviate from the exit pupil of the image-forming lens 6.

Figure 5B:
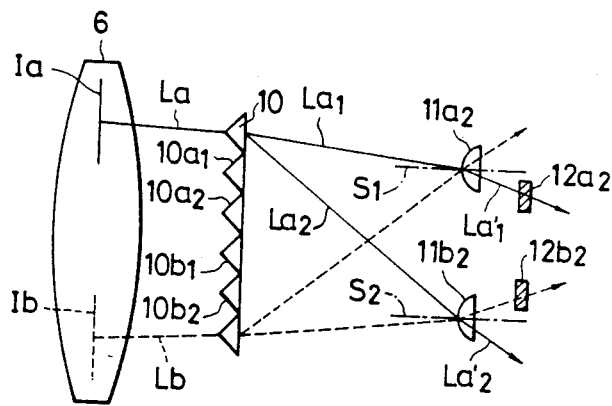

Conversely, considering a thin light beam La passing through the center of the image Ia formed on the exit pupil of the image-forming lens 6, it is separated into two beams directed in two directions by the multi-surfaced mirror 10, as shown in FIG. 5B, to provide a light beam $La_1$ reflected by the series of mirror surfaces $10a_1$, $10a_2$, ... and a light beam $La_2$ reflected by the other series of mirror surfaces $10b_1$, $10b_2$, ... and the beam $La_1$ is incident as a spot $La_1$ on the sensor $12a_2$ and the beam $La_2$ is incident as a spot $La_2$ on the insensitive zone intermediate the sensors $12b_2$ and $12b_3$. This also holds true of a light beam Lb. In this manner, the sensors $12a_2$ and $12b_2$ are disposed in opposite directions with respect to the optical axes $S_1$ and $S_2$ of the respective lenslets $11a_2$ and $11b_2$.

Figure 7:
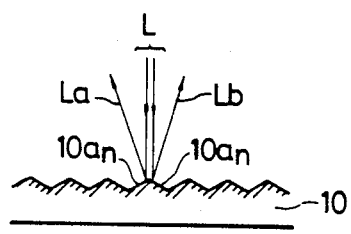
Figure 8:
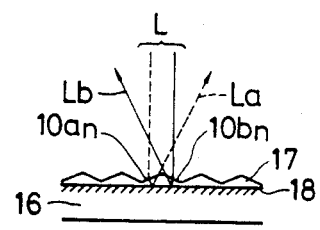

The polyhedral mirror 10 shown in FIG. 5A will now be described further. FIG. 7 shows the cross-sectional structure of the multi-surfaced mirror 10. The cross-section of the mirror surface thereof is in the form of a triangular wave, and incident light beam L may be wavefront-divided into two light beams La and Lb by inclined surfaces $10a_n$ and $10b_n$. FIG. 8 shows the cross-sectional structure of another multi-surfaced mirror 10. A minute microprism structure 17 formed of a transparent material of triangular wave configuration is provided on the upper layer of a substrate 16, and the upper surface of the substrate 16 provides a reflecting surface 18. In this case, the light beam L is not directly reflected by the prism structure 17, but is reflected by the reflecting surface 18 and divided into light beams La and Lb by the prism structure 17. The cross-section of the multi-surfaced mirror 10 is not limited to the triangular wave form, but may be, for example, a trapezoidal wave form.

Figure 9:
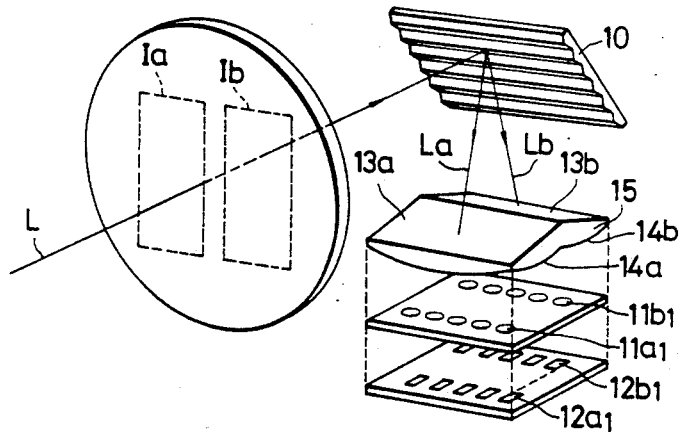

FIG. 9 shows another embodiment of the present invention. In the optical system of FIG. 5A, the image intensity distribution has been shifted to left and right by the multi-surfaced mirror 10, whereas in the present embodiment, the numerous mirror surfaces of the multi-surfaced mirror 10 are disposed horizontally so that two image intensity distributions are shifted forwardly and rearwardly. Also, in FIG. 5A, the series of lenslets $11a_1$, $11a_2$, ..., $11b_1$, $11b_2$, ... and the series of sensors $12a_1$, $12a_2$, ..., $12b_1$, $12b_2$, ... corresponding to the two image intensity distributions are arranged laterally in a row, whereas in the present embodiment, these are arranged in two forward and rearward series. Sensors $12a$ and $12b$ are projected as Ia and Ib upon the exit pupil of the image-forming lens 6 on the opposite sides of the optical axis of the image-forming lens 6.

In the above-described embodiments, the optical system is constructed with the multi-surfaced mirror 10 as the reflection type, but an optical system having a similar function can be constructed even if the multi-surfaced mirror 10 is of the transmission type.

The difference between the optical system of the present invention having such construction and the invention disclosed in U.S. Pat. No. 4,185,191 shown in FIG. 1 is that in the case of the present embodiment, the same image intensity distributions are spatially completely separately formed on the two series of surfaces of the lenslets and the respective image intensity distributions are received by two series of light-receiving systems each comprising multiple sets of a lenslet and a sensor and corresponding to the number of images.

As described above in detail, the optical system for detecting the state of focus in accordance with the present invention is a novel optical system in which at least two image intensity distributions are formed on the predetermined image-forming plane and which may be effectively used in a device for detecting in-focus and out-of-focus by utilizing the fact that detected images deviate relative to each other in accordance with the imaged condition thereof when the respective image intensity distributions are detected as by a CCD sensor array, and this optical system has the advantage that shading is hardly caused.

What we claim is:

1. An optical system for detecting the status of focus, comprising:
   an image-forming optical system;
   a sensor portion disposed near a predetermined image plane of said image-forming optical system, said sensor portion having a first sensor series and a non-overlapping second sensor series, said first sensor series having a plurality of first sensor units, each of said first sensor units having a first lens portion and a first sensor, said first lens portion having a light-condensing characteristic at least in a predetermined one-dimensional direction, said first sensor being disposed at a first position to receive light from said first lens portion, said second sensor series having a plurality of second sensors units, each of said second sensor units having a second lens portion and a second sensor, said second lens portion having a light-condensing characteristic at least in said one-dimensional direction, said second sensor being disposed at a second position to receive light from said second lens portion; and
   a beam splitting element disposed between said image-forming optical system and said predetermined image plane, said beam splitting element deflecting a light beam passed through said image-forming optical system in a plurality of directions and directing a first one of the deflected light beams to said first sensor series and a second one of the deflected light beams to said second sensor series;
   whereby detection of the state of focus of said image-forming optical system is effected by the use of output signals from said first and second sensor series which correspond to the image intensity distributions regarding respective object images.

2. The optical system according to claim 1, wherein said first position of said first sensor is a position at which only a light beam passed through a first portion of the exit pupil of said image-forming optical system is incident after having passed through said first lens portion, and said second position of said second sensor is a position at which only the light beam passed through a second portion of the exit pupil of said image-forming optical system is incident after having passed through said second lens portion.

3. The optical system according to claim 2, wherein each said lens portion has a respective optical axis, and the first sensor for the first lens portion of each said first sensor unit and the second sensor for the second lens portion of each said second sensor unit are disposed in opposite directions on the opposite sides of the optical axes of said first and second lens portions.

4. The optical system according to claim 3, wherein the first lens portions of said plurality of first sensor units and the second lens portions of said plurality of second sensor units are disposed on the same plane, and the first sensors of said plurality of first sensor units and the second sensors of said plurality of second sensor units are disposed on the same plane.

5. The optical system according to claim 2, wherein a first field lens is disposed between said beam splitting element and said first sensor series, a second field lens is disposed between said beam splitting element and said second sensor series, said first field lens causes said first sensor to be imaged near the first portion of the exit pupil of said image-forming optical system through said first lens portion, and said second field lens causes said second sensor to be imaged near the second portion of the exit pupil of said image-forming optical system through said second lens portion.

6. The optical system according to claim 5, wherein said first and said second field lens are made integral with each other.

7. The optical system according to claim 1, wherein said beam splitting element is in the form of a one-dimensional microprism and deflects an incident light beam in two directions.

8. The optical system according to claim 1, wherein said beam splitting element is spaced from an image-forming plan of said image optical system.

* * * * *

UNITED STATES PATENT AND TRADEMARK OFFICE
CERTIFICATE OF CORRECTION

PATENT NO. : 4,659,917
DATED : April 21, 1987
INVENTOR(S) : TAKASHI SUZUKI, ET AL.

It is certified that error appears in the above-identified patent and that said Letters Patent is hereby corrected as shown below:

COLUMN 1

Line 32, "show" should read --shows--.

COLUMN 4

Line 7, "offaxis" should read --off-axis--.

COLUMN 6

Line 14, "status" should read --state--.
    Line 29, "sors" should read --sor--.

COLUMN 8

Lines 11-12, "image-forming plan" should read --image plane--.
    Line 12, "image optical" should read --image-forming optical--.

Signed and Sealed this

Fifteenth Day of December, 1987

Attest:

DONALD J. QUIGG

*Attesting Officer*      *Commissioner of Patents and Trademarks*